United States Patent
Xu et al.

(10) Patent No.: US 11,522,647 B2
(45) Date of Patent: Dec. 6, 2022

(54) SINGLE-CARRIER RESOURCE MAPPING FOR NON-TERRESTRIAL NETWORK DEPLOYMENTS

(71) Applicant: QUALCOMM Incorporated, San Diego, CA (US)

(72) Inventors: Huilin Xu, San Diego, CA (US); Jun Ma, San Diego, CA (US); Xiao Feng Wang, San Diego, CA (US); Dan Zhang, San Diego, CA (US); Peter Gaal, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 16/891,830

(22) Filed: Jun. 3, 2020

(65) Prior Publication Data

US 2020/0389344 A1 Dec. 10, 2020

Related U.S. Application Data

(60) Provisional application No. 62/857,591, filed on Jun. 5, 2019.

(51) Int. Cl.
*H04L 27/26* (2006.01)
*H04W 72/04* (2009.01)
*H04L 5/00* (2006.01)

(52) U.S. Cl.
CPC ........ *H04L 5/0007* (2013.01); *H04L 27/2601* (2013.01); *H04L 27/2602* (2013.01); *H04L 27/26025* (2021.01); *H04W 72/0446* (2013.01); *H04W 72/0453* (2013.01)

(58) Field of Classification Search
CPC ............. H04L 5/0007; H04L 27/26025; H04L 27/2601; H04L 27/2602; H04W 72/0446; H04W 72/0453
See application file for complete search history.

(56) References Cited

U.S. PATENT DOCUMENTS

| 10,142,082 | B1 | 11/2018 | Shattil |
| 2019/0020522 | A1 | 1/2019 | Sun et al. |

FOREIGN PATENT DOCUMENTS

| CN | 102752255 B | 4/2015 |
| EP | 2398200 A1 | 12/2011 |

(Continued)

OTHER PUBLICATIONS

Marilynn P. Wylie-Green et al., 'A Novel CPM-SC-FDMA Transmission Scheme for Power Efficient Communication', 2008 IEEE, p. 1-6. (Year: 2008).*

(Continued)

*Primary Examiner* — Melvin C Marcelo
(74) *Attorney, Agent, or Firm* — Harrity & Harrity, LLP

(57) ABSTRACT

Various aspects of the present disclosure generally relate to wireless communication. In some aspects, a base station (BS) may map a plurality of resource elements from an orthogonal frequency division multiplexing (OFDM) resource structure to respective time-domain samples of a plurality of time-domain samples included in a single-carrier resource structure. The BS may transmit the plurality of time-domain samples to a user equipment (UE). Numerous other aspects are provided.

30 Claims, 11 Drawing Sheets

(56) References Cited

FOREIGN PATENT DOCUMENTS

WO          2008150144 A2     12/2008
WO          WO-2018034533 A1 *   2/2018             H03M 13/27

OTHER PUBLICATIONS

Hughes Network Systems: "Satellite Payload Characteristics and their Performance Impact on NTN Signals", 3GPP Draft, 3GPP TSG RAN1 Meeting #93, R1-1806095, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441309, 3 Pages, Retrieved from the Internet: URL: http://www.3gpp.org/ftp/Meetings%5F3GPP%5FSYNC/RAN1/DocS/, [retrieved on May 20, 2018], Section 4.

International Search Report and Written Opinion—PCT/US2020/036119—ISAEPO—dated Sep. 18, 2020.

Thales, et al., NR-NTN: TP for Chap 7.3 NR Modifications to Support NTN, 3GPP Draft; 3GPP TSG RAN Meeting #80, RP-181394_CHAP 7.3REV, 3rd Generation Partnership Project (3GPP), Mobile Competence Centre; 650, Route Des Lucioles; F-06921 Sophia-Antipolis Cedex; France, vol. TSG RAN, No. La Jolla, USA; Jun. 11, 2018-Jun. 14, 2018, Jun. 14, 2018 (Jun. 14, 2018), XP051512027, 34 Pages, Retrieved from the Internet: URL: http://www.3gpp.org/ftp/tsg%5Fran/TSG%5FRAN/TSGR%5F80/Docs/RP%2D181394%2Ezip [retrieved on Jun. 14, 2018], Section 7.3.2.2.2.

* cited by examiner

SINGLE-CARRIER RESOURCE MAPPING FOR NON-TERRESTRIAL NETWORK DEPLOYMENTS

CROSS-REFERENCE TO RELATED APPLICATION

This application claims priority to U.S. Provisional Patent Application No. 62/857,591, filed on Jun. 5, 2019, entitled "SINGLE-CARRIER RESOURCE MAPPING FOR NON-TERRESTRIAL NETWORK DEPLOYMENTS," which is hereby expressly incorporated by reference herein.

FIELD OF THE DISCLOSURE

Aspects of the present disclosure generally relate to wireless communication and to techniques and apparatuses for single-carrier resource mapping for non-terrestrial network deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a plurality of time-domain samples included in a single-carrier resource structure; and identifying data associated with one or more downlink channels of the BS, included in the plurality of time-domain samples, based at least in part on a mapping between an orthogonal frequency division multiplexing (OFDM) resource structure and the single-carrier resource structure.

In some aspects, a UE for wireless communication may include memory and one or more processors operatively coupled to the memory. The memory and the one or more processors may be configured to receive, from a BS, a plurality of time-domain samples included in a single-carrier resource structure; and identify data associated with one or more downlink channels of the BS, included in the plurality of time-domain samples, based at least in part on a mapping between an OFDM resource structure and the single-carrier resource structure.

In some aspects, a non-transitory computer-readable medium may store one or more instructions for wireless communication. The one or more instructions, when executed by one or more processors of a UE, may cause the one or more processors to receive, from a BS, a plurality of time-domain samples included in a single-carrier resource structure; and identify data associated with one or more downlink channels of the BS, included in the plurality of time-domain samples, based at least in part on a mapping between an OFDM resource structure and the single-carrier resource structure.

In some aspects, an apparatus for wireless communication may include means for receiving, from a BS, a plurality of time-domain samples included in a single-carrier resource structure; and means for identifying data associated with one or more downlink channels of the BS, included in the plurality of time-domain samples, based at least in part on a mapping between an OFDM resource structure and the single-carrier resource structure.

In some aspects, a method of wireless communication, performed by a base station (BS), may include mapping a plurality of resource elements from an OFDM resource structure to respective time-domain samples of a plurality of time-domain samples included in a single-carrier resource structure; and transmitting the plurality of time-domain samples to a UE.

In some aspects, a BS for wireless communication may include memory and one or more processors operatively coupled to the memory. The memory and the one or more processors may be configured to map a plurality of resource elements from an OFDM resource structure to respective time-domain samples of a plurality of time-domain samples included in a single-carrier resource structure; and transmit the plurality of time-domain samples to a UE.

In some aspects, a non-transitory computer-readable medium may store one or more instructions for wireless communication. The one or more instructions, when executed by one or more processors of a BS, may cause the one or more processors to map a plurality of resource elements from an OFDM resource structure to respective time-domain samples of a plurality of time-domain samples included in a single-carrier resource structure; and transmit the plurality of time-domain samples to a UE.

In some aspects, an apparatus for wireless communication may include means for mapping a plurality of resource elements from an OFDM resource structure to respective time-domain samples of a plurality of time-domain samples included in a single-carrier resource structure; and means for transmitting the plurality of time-domain samples to a UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
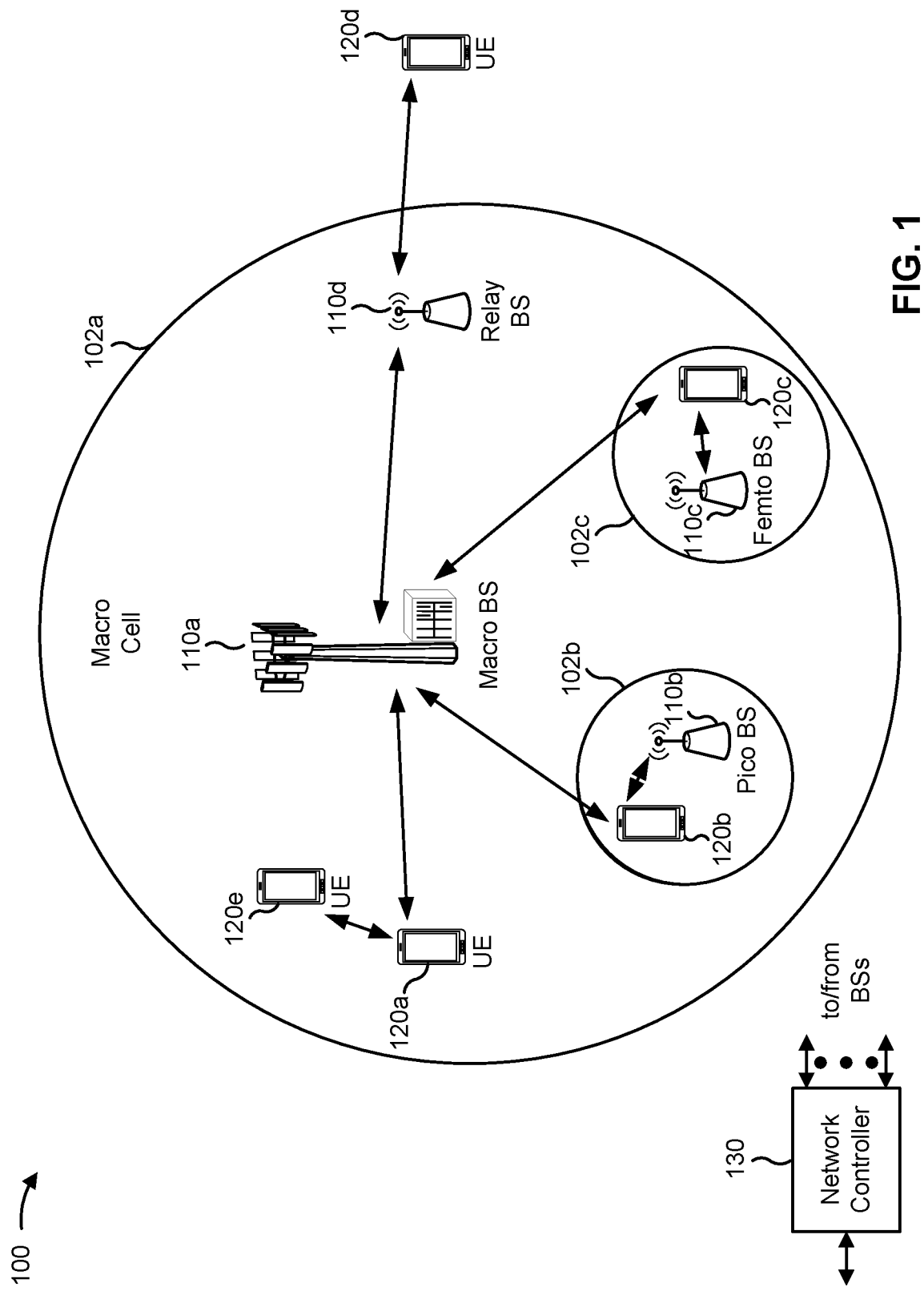
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may remain stationary or move according to the location of a mobile BS. For example, wireless network 100 may include one or more a non-terrestrial network (NTN) deployments in which satellites may be used as BSs. In this case, the satellites may communicate directly and/or indirectly with other entities in wireless network 100 using satellite communication. The other entities may include UEs, other satellites in the one or more NTN deployments, other types of BSs (e.g., stationary or ground-based BSs), one or more components and/or devices included in a core network of wireless network 100, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
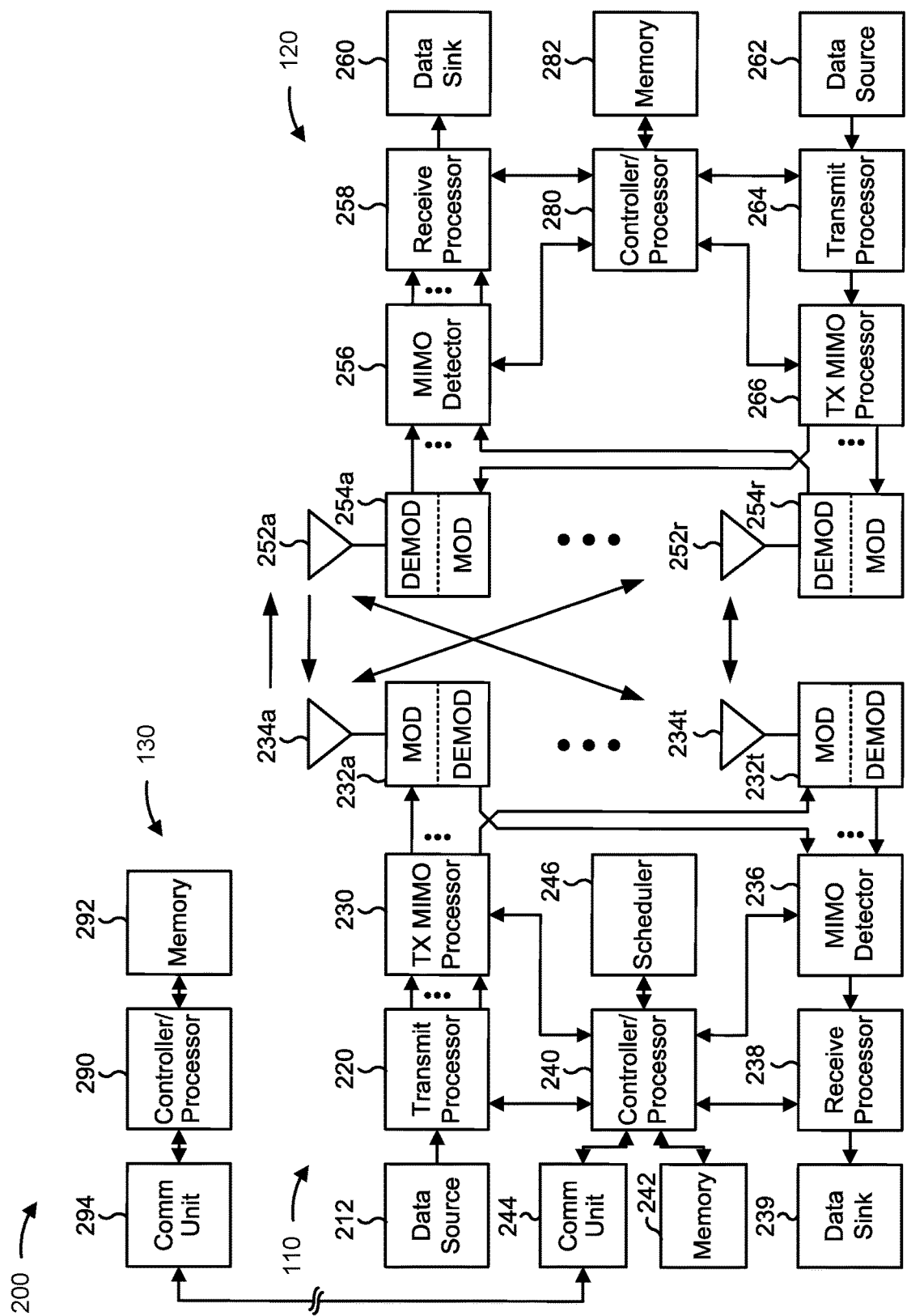
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with single-carrier resource mapping for NTN deployments, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a BS 110, a plurality of time-domain samples included in a single-carrier resource structure, means for identifying data associated with one or more downlink channels of the BS, included in the plurality of time-domain samples, based at least in part on a mapping between an OFDM resource structure and the single-carrier resource structure, and/or the like. In some aspects, such means may include one or more components of UE 120 described in connection with FIG. 2.

In some aspects, base station 110 may include means for mapping a plurality of resource elements from an OFDM resource structure to respective time-domain samples of a plurality of time-domain samples included in a single-carrier resource structure, means for transmitting the plurality of time-domain samples to a UE 120, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
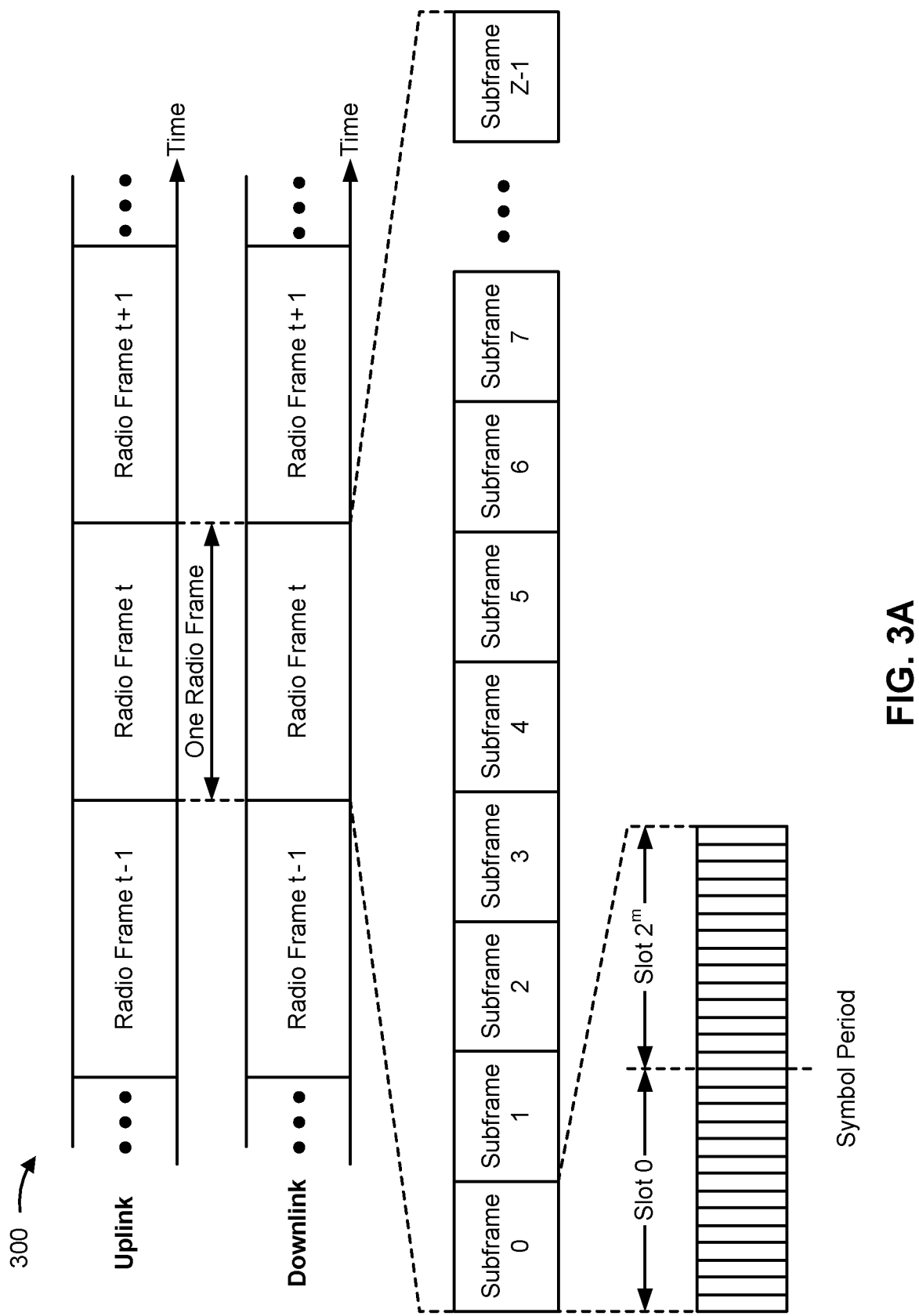
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used. For example, a BS, such as a satellite BS in an NTN deployment, may be configured to support a plurality of frame structures. In this case, a satellite BS may be configured to map between an OFDM frame structure and a single-carrier frame structure.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
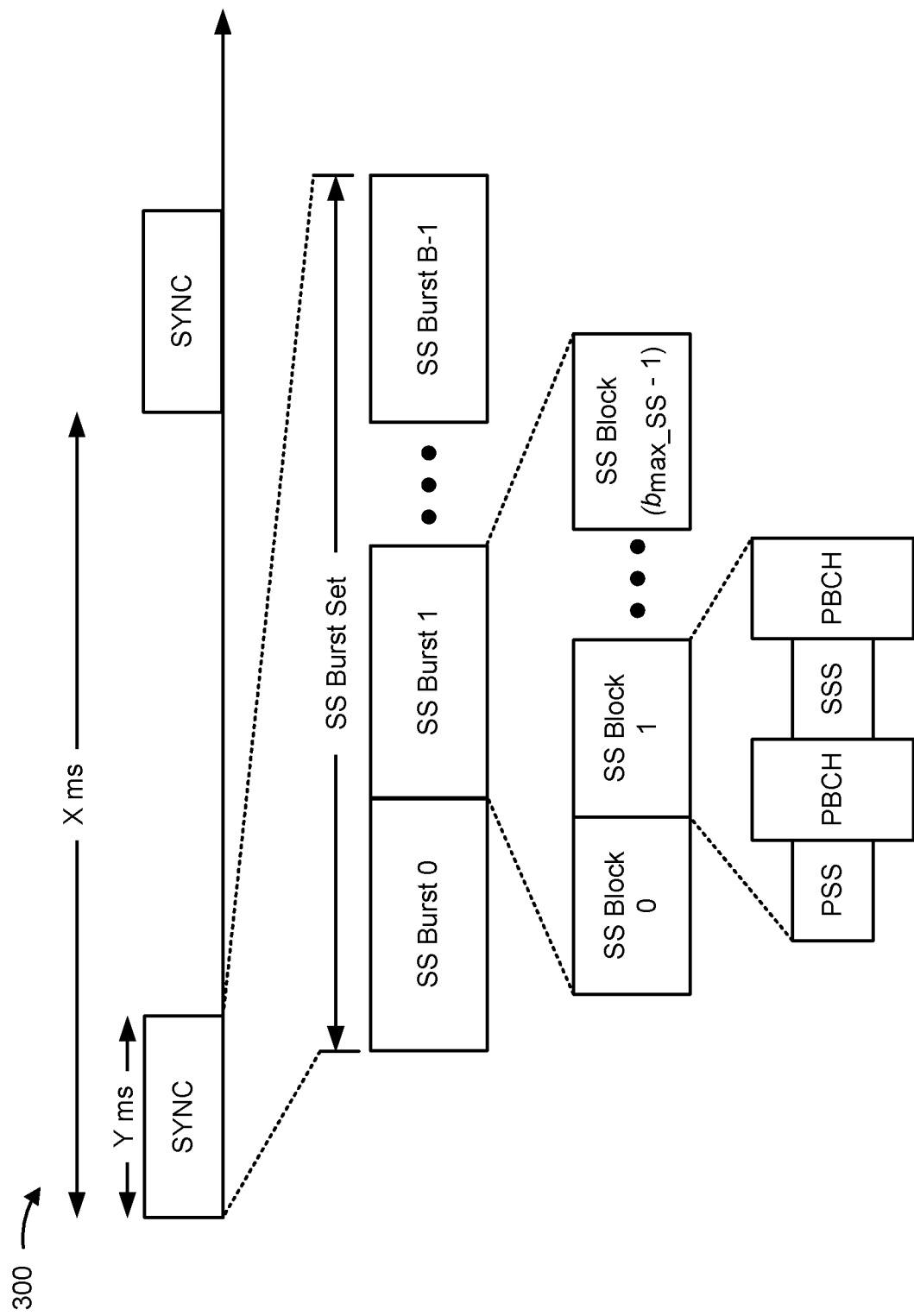
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
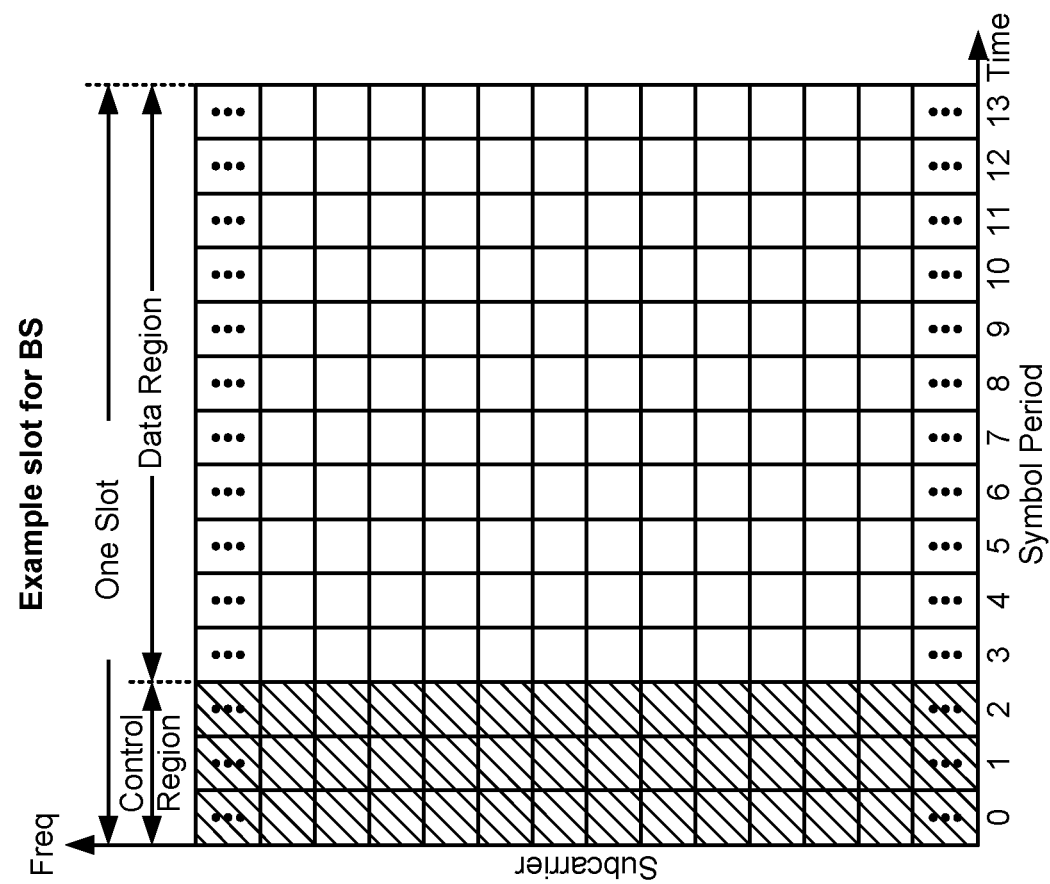
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems and/or access methods, such as NTN configurations and/or access methods. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

In some aspects, a BS, such as a satellite BS in an NTN deployment, may be configured to support a plurality of slot formats. For example, a satellite BS may be configured to map between an OFDM slot format, such as slot format 410 illustrated in FIG. 4, and a single-carrier slot format.

As indicated above, FIG. 4 is provided as an example. Other examples may differ from what is described with regard to FIG. 4.

As indicated above, a wireless network, such as an NR wireless network may include one or more NTN deployments that use satellites as BSs (e.g., a low Earth orbit (LEO) satellite, a medium Earth orbit (MEO) satellite, a geostationary equatorial orbit (GEO), a high-altitude platform (HAP), and/or the like). While these deployments may permit a satellite BS to provide communication coverage to a large geographic area, communication using an OFDM slot structure may not be suitable in NTN deployments due to the increased distance between the BS and a UE (e.g., due to the altitude of the BS and/or the large geographic area of coverage). OFDM modulation may result in a high peak to average power ratio (PAPR) of transmissions at the BS, in which case the BS may need to reduce transmit power in order to maintain power amplifier linearity and to reduce and/or prevent power amplifier saturation. As a result, the BS may need to be configured with a larger battery and/or more powerful power amplifier circuitry to compensate for not being capable of utilizing the full transmit power of the power amplifier so that the BS may transmit at sufficient power over the long distances in the NTN deployment.

Some techniques and apparatuses described herein are capable of single-carrier resource mapping for NTN deployments. A BS (e.g., a satellite in an NTN deployment) may be configured to map between an OFDM slot format, such as slot format 410 illustrated in FIG. 4, and a single-carrier slot format. Since single-carrier modulation may provide a lower PAPR relative to OFDM modulation (e.g., 5-6 dB compared with 12-13 dB of OFDM modulation), the BS may be permitted to transmit at a higher transmit power (e.g., relative to OFDM modulation) while maintaining power amplifier linearity, which increases the efficiency of the power amplifier, reduces or eliminates the need for a larger battery and/or more powerful power amplifier circuitry to compensate for not being capable of fully utilizing the full transmit power of the power amplifier so that the BS may transmit at sufficient power over the long distances in the NTN deployment, and/or the like.

Figure 5:
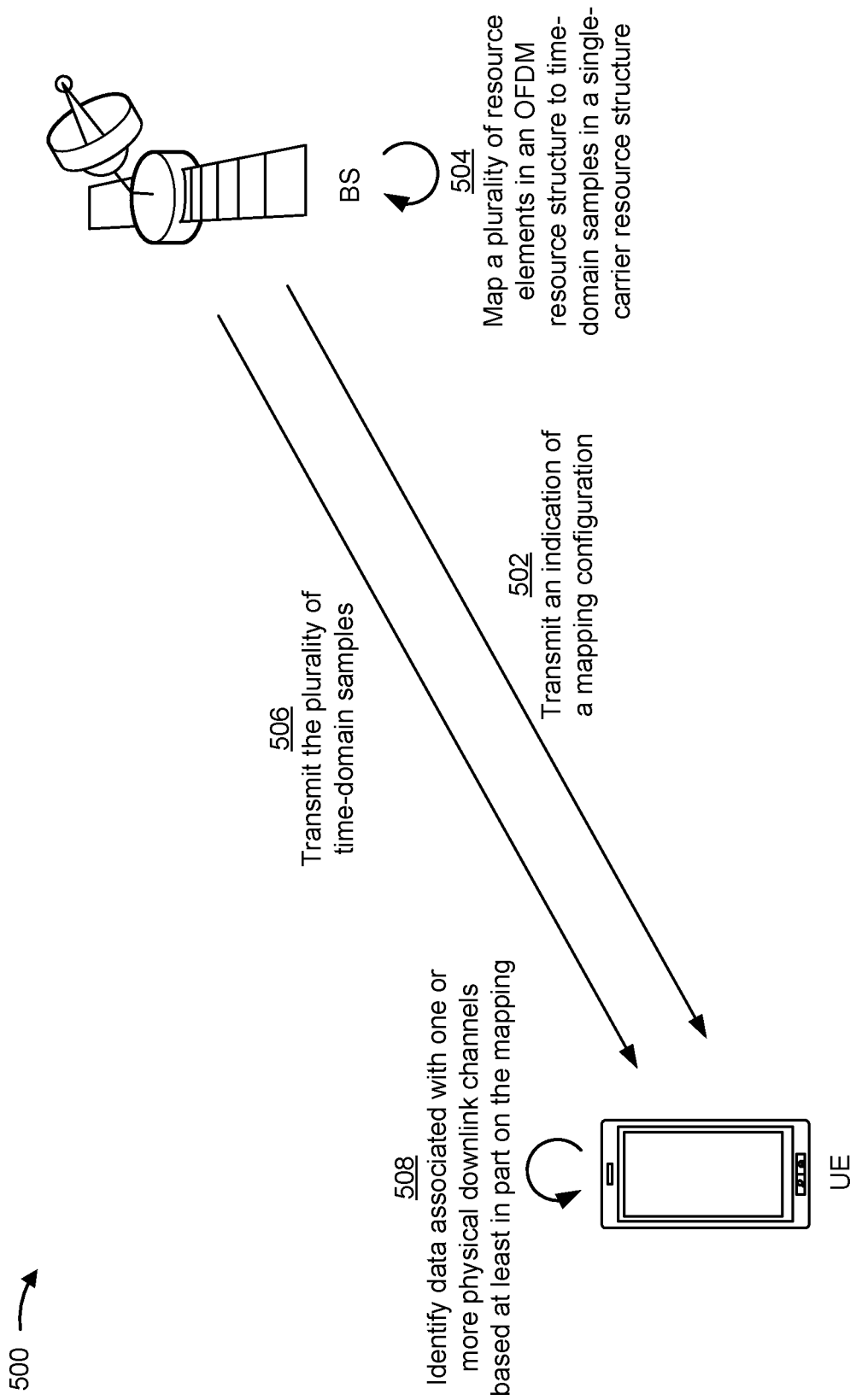
FIGS. 5-8 are diagrams illustrating examples of single-carrier resource mapping for non-terrestrial network deployments, in accordance with various aspects of the present disclosure.

FIG. 5 is a diagram illustrating an example 500 of single-carrier resource mapping for NTN deployments, in accordance with various aspects of the present disclosure. As shown in FIG. 5, example 500 may include communication between a BS (e.g., BS 110) and a UE (e.g., UE 120). In some aspects, the BS may be included in an NTN deployment of a wireless network (e.g., wireless network 100). In this case, the BS may be implemented by a satellite, an HAP, a ground backhaul BS that servers a satellite BS or HAP, and/or the like, that communicates directly with the UE via a satellite communication link and/or another type of non-terrestrial communication link.

In some aspects, the BS and the UE may communicate using an OFDM resource structure (e.g., which may include a frame structure such as frame structure 300 illustrated in FIG. 3A and/or a slot structure such as slot format 410 illustrated in FIG. 4) and/or another type of resource structure. For example, to reduce PAPR when transmitting with high power over long distances in an NTN deployment (e.g., when communicating with ground-based UEs), the BS may communicate with the UE using a single-carrier resource structure, which may include a single-carrier frame structure, a single-carrier slot format, and/or the like. In this case, the BS may generate data, signaling, and/or the like, modulate the data, signaling, and/or the like to an OFDM resource structure (e.g., modulate the data, signaling, and/or the like to resource elements, resource blocks, subframes, radio frames, and/or the like), and map the resource elements, resource blocks, subframes, radio frames, and/or the like of the OFDM resource structure to the single-carrier frame structure (e.g., to single-carrier radio frames, single-carrier subframes, single-carrier slots, time-domain samples, and/or the like). The BS may perform the mapping at the physical layer (e.g., on physical channels) such that there is little to no impact on transport and/or logical channels and higher layers such as medium access control (MAC) layers and above.

As shown in FIG. 5, and by reference number 502, to communicate with the UE using a single-carrier resource structure, the BS may generate a mapping configuration and may transmit an indication of the mapping configuration to the UE. The mapping configuration may include one or more mapping parameters for mapping between an OFDM resource structure and the single-carrier resource structure.

The BS may transmit the indication of the mapping configuration to the UE in various types of communications. For example, the BS may transmit the indication of the mapping configuration in one or more system information communications, one or more PBCH communications, one or more PDCCH communications, one or more PDSCH communications, and/or the like. The one or more system information communications may include, for example, a master information block (MIB), a system information block (SIB), a remaining minimum system information (RMSI) communication, an other system information (OSI) communication, and/or the like. The one or more PDCCH communications and/or the one or more PDSCH communications may include a radio resource control (RRC) communication, a MAC control element (MAC-CE) communication, a downlink control information (DCI) communication, and/or the like. The BS may transmit the indication of the mapping configuration to the UE prior to RRC connection establishment, during initial access, once the BS and the UE are RRC connected, and/or the like.

In some aspects, the one or more mapping parameters may include a frequency parameter that indicates and/or specifies a frequency range in which the BS is to map between the OFDM resource structure and the single-carrier resource structure. The BS may map resource elements of the OFDM resource structure in the frequency range to time-domain samples in the single-carrier resource structure. As an example, the frequency parameter may specify that the BS is to map between the OFDM resource structure and the single-carrier resource structure across the entire bandwidth or a subset of the bandwidth of the downlink associated with the BS. As another example, the frequency parameter may specify that the BS is to map between the OFDM resource structure and the single-carrier resource structure across the active bandwidth part (BWP), associated with the UE, of the downlink associated with the BS. As another example, the frequency parameter may specify that the BS is to map between the OFDM resource structure and the single-carrier resource structure across an entire bandwidth or a subset of the bandwidth of a particular downlink channel associated with the BS.

In some aspects, the one or more parameters may include a sampling rate parameter that indicates and/or specifies a sampling rate for mapping between the OFDM resource structure and the single-carrier resource structure. In some aspects, the sampling rate may correspond to the sampling rate of the OFDM resource structure such that each resource element in the OFDM resource structure is mapped to a single time-domain sample in the single-carrier resource structure. In some aspects, the sampling rate may be based at least in part on the frequency range specified by the frequency parameter. For example, the sampling rate may increase as the frequency range increases, and may decrease as the frequency range decreases.

In some aspects, the one or more parameters may include a time parameter that indicates and/or specifies a time range or duration in which the BS is to map between the OFDM resource structure and the single-carrier resource structure. The BS may map resource elements of the OFDM resource structure in the time range to time-domain samples in the single-carrier resource structure. Each time range may correspond to a respective single-carrier waveform such that the BS may map resource elements of the OFDM resource structure in the time range to time-domain samples in a particular waveform of the single-carrier resource structure. As an example, if the time parameter specifies a time range of one or more slots, the BS may map the resource elements, included in the resource block (or resource blocks) across the frequency range specified by the frequency parameter, in one or more time-domain samples of a single-carrier waveform in the single-carrier resource structure.

In some aspects, the one or more parameters may include one or more channel parameters. The one or more channel parameters may indicate and/or specify which physical downlink channels are to be mapped (e.g., PDCCH, PDSCH, synchronization signal blocks (SSBs), PBCH, and/or the like). Accordingly, depending on which physical downlink channels are to be mapped, the BS may map all or a subset of resource elements included in a resource block (or set of resource blocks) in the time range and the frequency range respectively specified by the time parameter and the frequency parameter. Moreover, the one or more channel parameters may indicate and/or specify an order in which different physical downlink channels are to be mapped, in which different types of physical downlink channels are to be mapped, and/or the like. In this case, the resource elements of the physical downlink channels may be independently and/or separately mapped in the order specified by the one or more channel parameters, may be independently and/or separately mapped according to channel type, and/or the like.

In some aspects, the one or more parameters may include a mapping order parameter that indicates and/or specifies an order for mapping resource elements to time-domain samples within the time range and/or frequency range specified by the mapping configuration, that specifies an order for mapping resource blocks to the single carrier resource structure, and/or the like. For example, the mapping order parameter may specify a row-major order in which resource elements included in a resource block and associated with a first subcarrier are mapped first, resource elements included in the resource block and associated with a second subcarrier are mapped after the resource elements associated with the first subcarrier are mapped, and so on. As another example, the mapping order parameter may specify a column-major order in which resource elements included in a resource block and associated with a first symbol are mapped first, resource elements included in the resource block and associated with a second symbol are mapped after the resource elements associated with the first symbol are mapped, and so on. Other example mapping orders are illustrated below in connection with FIG. 8.

In some aspects, the one or more parameters included in the mapping configuration may be based at least in part on information received from the UE. For example, the UE may transmit, to the BS, an indication of a UE capability for single-carrier communication, an indication of a requested mapping configuration, and/or the like, and the BS may generate the mapping configuration based at least in part on the UE capability and/or requested mapping configuration.

As further shown in FIG. 5, and by reference number 504, the BS may map a plurality of resource elements in an OFDM resource structure to time-domain samples in a single-carrier resource structure. The plurality of resource elements may carry data, signaling, control information, reference signal, and/or the like associated with various types of physical downlink channels. In some aspects, the BS may map the plurality of resource elements to the time-domain samples according to the one or more parameters specified in the mapping configuration. For example, the BS may map the plurality of resource elements, included in the time range and/or frequency range respectively specified by the time parameter and the frequency parameter, to respective time-domain samples according to the sampling rate parameter, and/or in the channel order and/or mapping order respectively specified by the one or more channel parameters and the mapping order parameter.

As further shown in FIG. 5, and by reference number 506, the BS may transmit the plurality of time-domain samples to the UE. In some aspects, the BS may transmit the plurality of time-domain samples in one or more single-carrier waveforms. As further shown in FIG. 5, and by reference number 508, the UE may receive the plurality of time-domain samples and may identify data (and/or signaling, control information, reference signal, and/or the like) associated with one or more physical downlink channels based at least in part on the mapping configuration received from the BS. For example, the UE may identify the time-domain samples that carry PDCCH data, signaling, and/or control information based at least in part on the mapping order parameter, the one or more channel parameters, the time parameter, the frequency parameter, the sample rate parameter, and/or the like. The UE may identify the time-domain samples that carry other physical downlink channel data, signaling, and/or control information in a similar manner.

In this way, the BS may be configured to map between an OFDM resource structure and a single-carrier resource structure. Since single-carrier modulation may provide a lower PAPR relative to OFDM modulation, the BS may be permitted to transmit at a higher transmit power (e.g., relative to OFDM modulation) while maintaining power amplifier linearity, which increases the efficiency of the power amplifier, reduces or eliminates the need for a larger battery and/or more powerful power amplifier circuitry to compensate for not being capable of fully utilizing the full transmit power of the power amplifier so that the BS may transmit at sufficient power over the long distances in the NTN deployment, and/or the like.

As indicated above, FIG. 5 is provided as an example. Other examples may differ from what is described with respect to FIG. 5.

Figure 6:
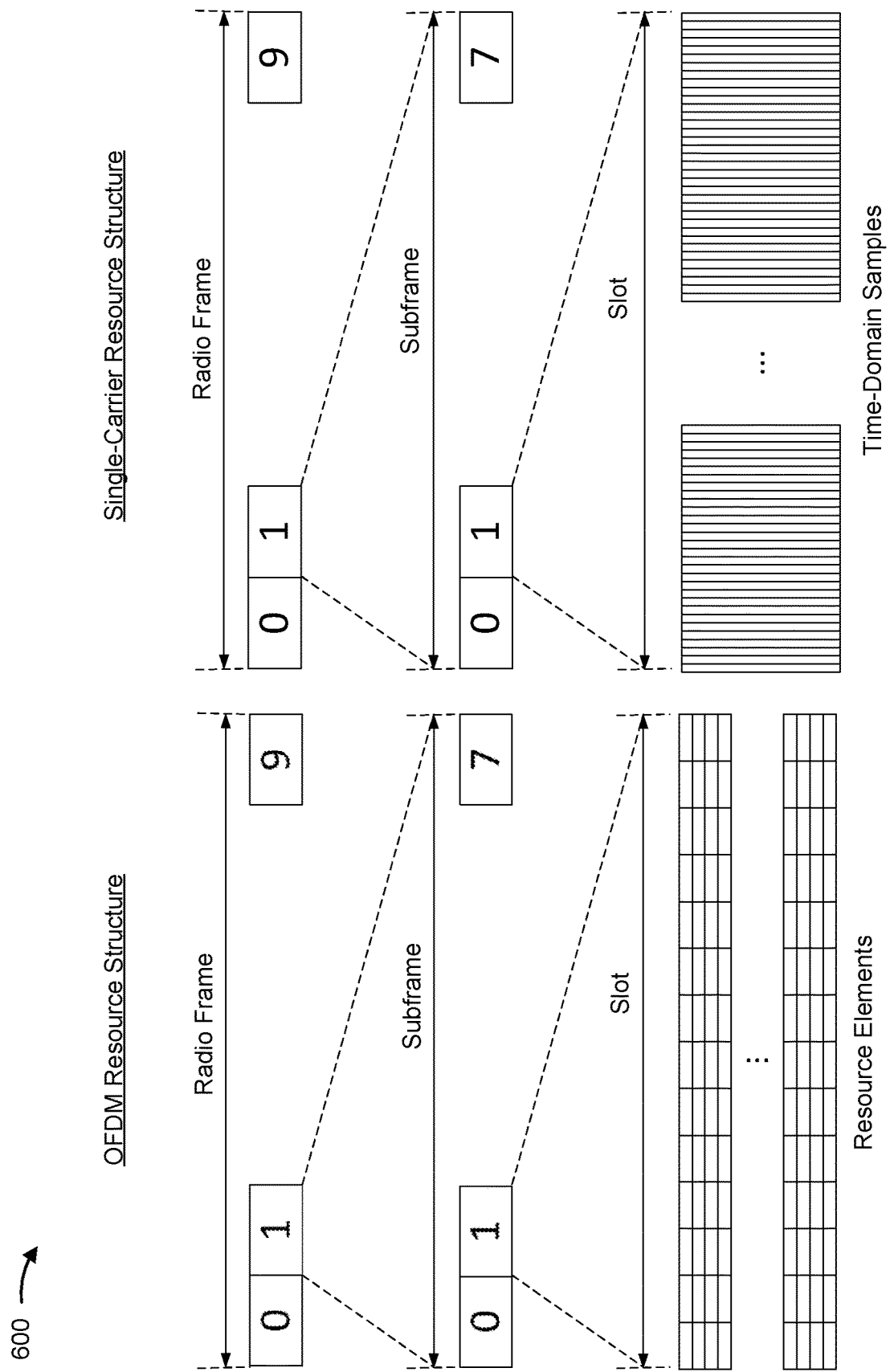

FIG. 6 illustrates an example 600 of a mapping between an OFDM resource structure and a single-carrier resource structure. Other example mappings may be implemented. In some aspects, the OFDM resource structure may include a frame structure similar to frame structure 300 of FIG. 3A and a slot format similar to slot format 410 of FIG. 4.

To map a plurality of resource elements in the OFDM resource structure to respective time-domain samples in the single-carrier resource structure, a BS may map each OFDM radio frame (e.g., independently and/or separately) of a plurality of OFDM radio frames in the OFDM resource structure to respective single-carrier radio frames in the single-carrier resource structure. For example, OFDM radio frame 0 may map to single-carrier radio frame 0, OFDM radio frame 1 may map to single-carrier radio frame 1, and so on.

The BS may map each OFDM subframe (e.g., independently and/or separately) of the plurality of OFDM subframes in each of the OFDM radio frames to respective single-carrier subframes in the single-carrier resource structure. For example, OFDM subframe 0 may map to single-carrier subframe 0, OFDM subframe 1 may map to single-carrier subframe 1, and so on.

The BS may map each OFDM slot (e.g., independently and/or separately) of the plurality of OFDM subframes in each of the OFDM subframes to respective single-carrier slots in the single-carrier resource structure. Within each OFDM slot, the BS may map the resource elements to time-domain samples in the corresponding single-carrier slot.

To map the resource elements to the time-domain samples, the BS may determine a quantity of time-domain samples that is needed in order to map the resource elements to time-domain samples. For example, if the sampling rate specifies a one-to-one mapping between resource elements and time-domain samples, the quantity of time-domain samples that is needed in order to map the resource elements to time-domain samples may be equal to the quantity of resource elements. The BS may begin mapping a resource element segment (e.g., which may correspond to a set of resource blocks associated with a particular physical downlink channel or a subset of resource blocks associated with a particular physical downlink channel) to the single-carrier resource structure by identifying a starting time-domain sample for the resource element segment, determining a length for the resource element segment, and mapping the resource elements in the resource element segment based at least in part on the starting time-domain sample and associated length. The BS may proceed with mapping other resource element segments in a similar manner.

As indicated above, FIG. 6 is provided as an example. Other examples may differ from what is described with respect to FIG. 6.

Figure 7:
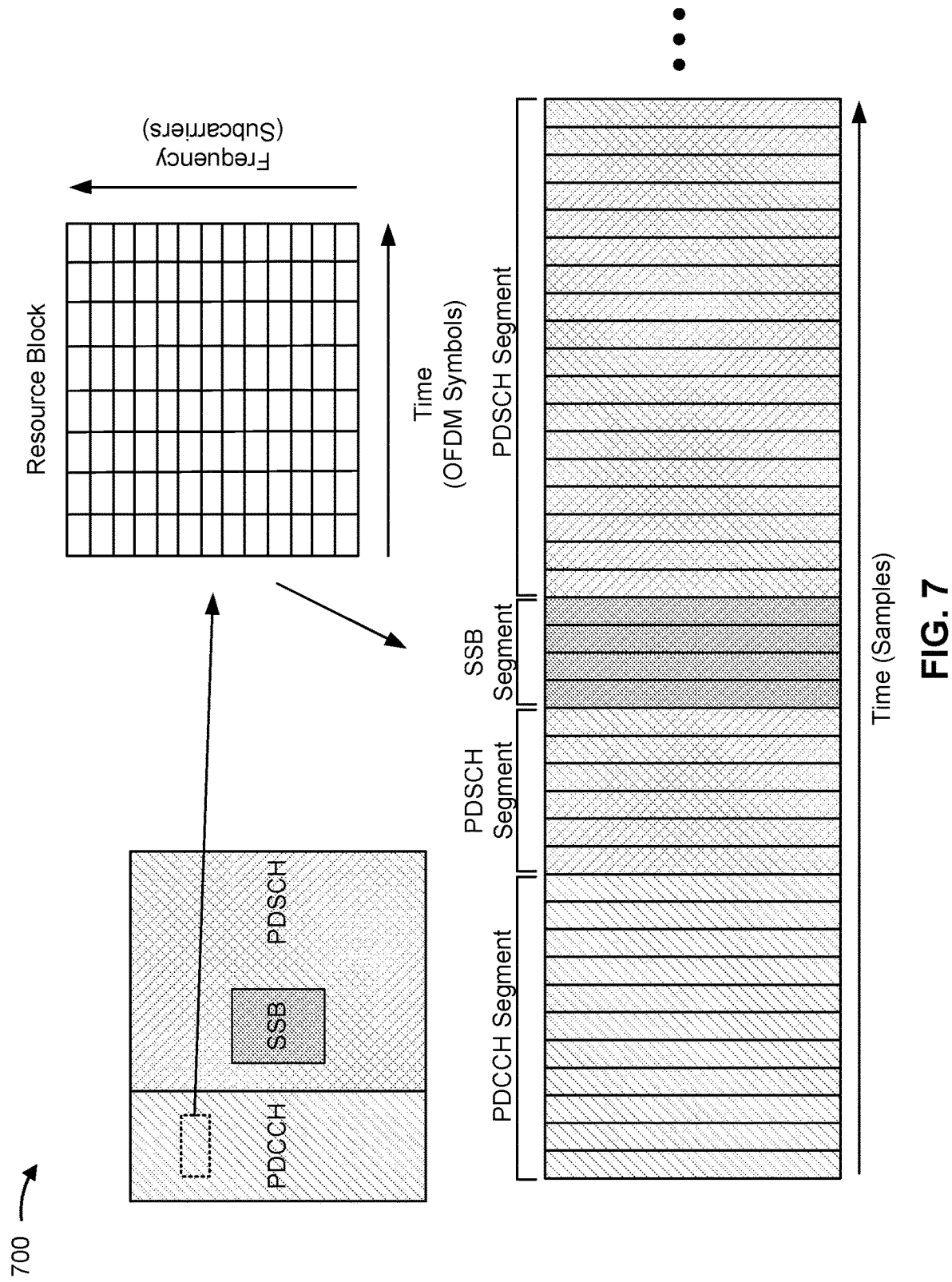

FIG. 7 illustrates an example 700 of a mapping between an OFDM slot structure and a single-carrier resource structure. Other example mappings may be implemented. In some aspects, the OFDM resource structure may include a frame structure similar to frame structure 300 of FIG. 3A and a slot format similar to slot format 410 of FIG. 4.

As shown in FIG. 7, a BS may independently and/or separately map resource elements of different physical downlink channel types to the single-carrier resource structure. For example, the BS may map resource elements of a PDCCH independently and/or separately from resource elements of an SSB and/or resource elements of a PDSCH, and/or the like. Moreover, the BS may map resource element segments of the different physical downlink channels to the single-carrier resource structure. In some aspects, each physical downlink channel type may be associated with a respective resource element structure. In this case, the length of each resource element segment corresponds to a quantity of resource elements associated with the respective physical downlink channel.

In some aspects, and as shown in FIG. 7, a physical downlink channel may be associated with a plurality of resource segments. For example, since the PDSCH and the SSB are time division multiplexed and frequency division multiplexed in the OFDM resource structure, the BS may separate the PDSCH and/or the SSB into a plurality of resource block segments (e.g., because the SSB may need to be transmitted at a particular time location).

As indicated above, FIG. 7 is provided as an example. Other examples may differ from what is described with respect to FIG. 7.

Figure 8:
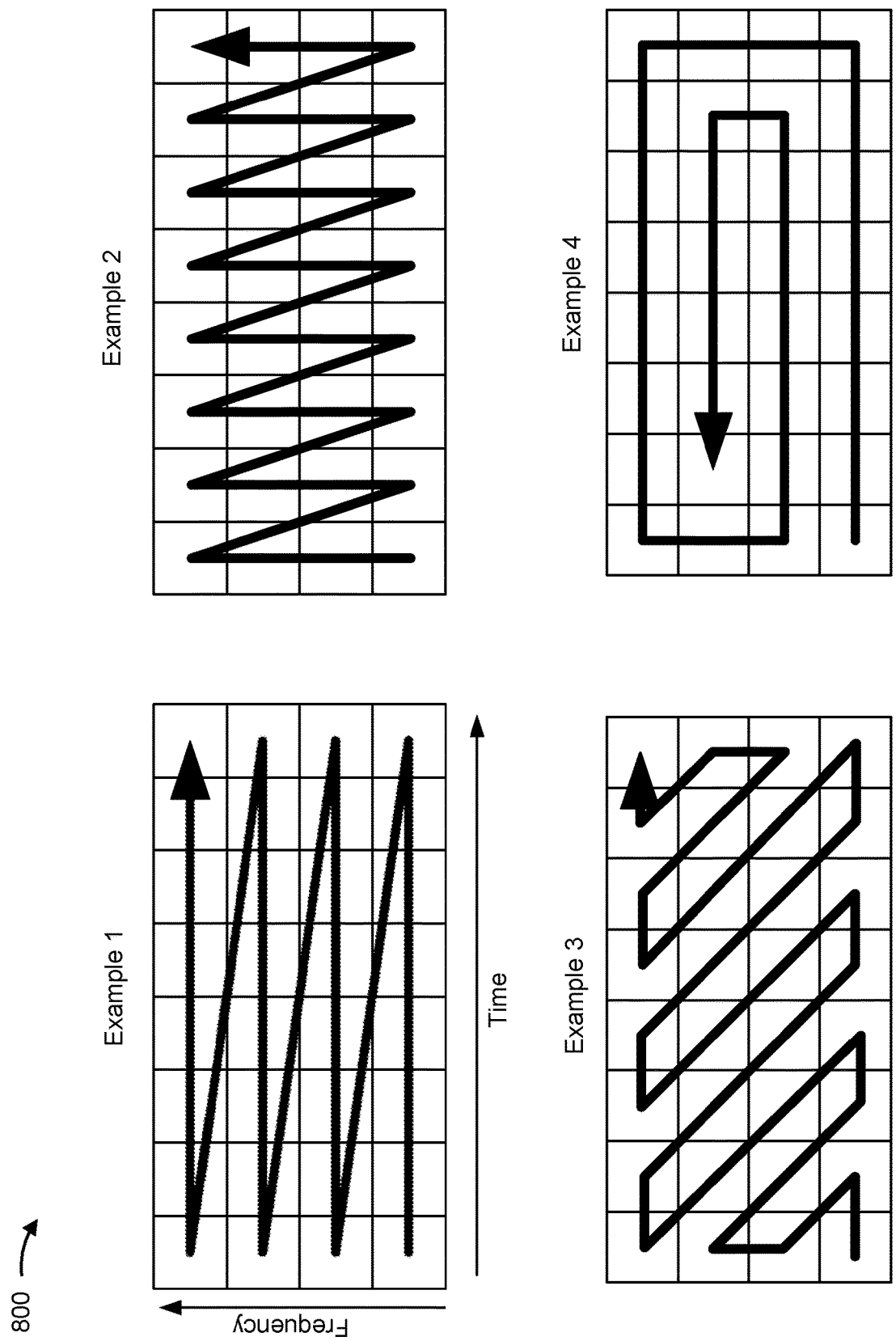

FIG. 8 illustrates various examples 800 of mapping orders for mapping between an OFDM resource structure and a single-carrier resource structure. Other example mapping orders may be implemented. In some aspects, the OFDM resource structure may include a frame structure similar to frame structure 300 of FIG. 3A and a slot format similar to slot format 410 of FIG. 4.

Example 1, shown in FIG. 8, illustrates an example of a row-major mapping order. In a row-major mapping order, a BS may independently and/or separately map all resource elements associated with a particular subcarrier before proceeding with mapping resource elements associated with another subcarrier. In this way, the BS proceeds along the rows of a resource block when mapping resource elements to time-domain samples. Moreover, the BS may implement a row-major mapping technique for the resource blocks that are included in a time range and/or frequency range specified by a mapping configuration. In this case, the BS may map all resource blocks associated with a particular set of subcarriers before proceeding with mapping resource blocks associated with another set of subcarriers.

Example 2, shown in FIG. 8, illustrates an example of a column-major mapping order. In a column-major mapping order, a BS may independently and/or separately map all resource elements associated with a particular symbol before proceeding with mapping resource elements associated with another symbol. In this way, the BS proceeds along the columns of a resource block when mapping resource elements to time-domain samples. Moreover, the BS may implement a column-major mapping technique for the resource blocks that are included in a time range and/or frequency range specified by a mapping configuration. In this case, the BS may map all resource blocks associated with a particular slot before proceeding with mapping resource blocks associated with another slot.

Example 3 and Example 4, shown in FIG. 8, illustrate hybrid mapping orders. Example 3 illustrates a diagonal mapping order, in which a BS may map resource elements (and/or resource blocks) by diagonally proceeding through a resource block or resource blocks and/or a time-frequency range. Example 4 illustrates a circular mapping order in which a BS may map resource elements (and/or resource blocks) by proceeding in an inwardly (or outwardly) progressing circle in a resource block or resource blocks and/or a time-frequency range.

As indicated above, FIG. 8 is provided as one or more examples. Other examples may differ from what is described with respect to FIG. 8.

Figure 9:
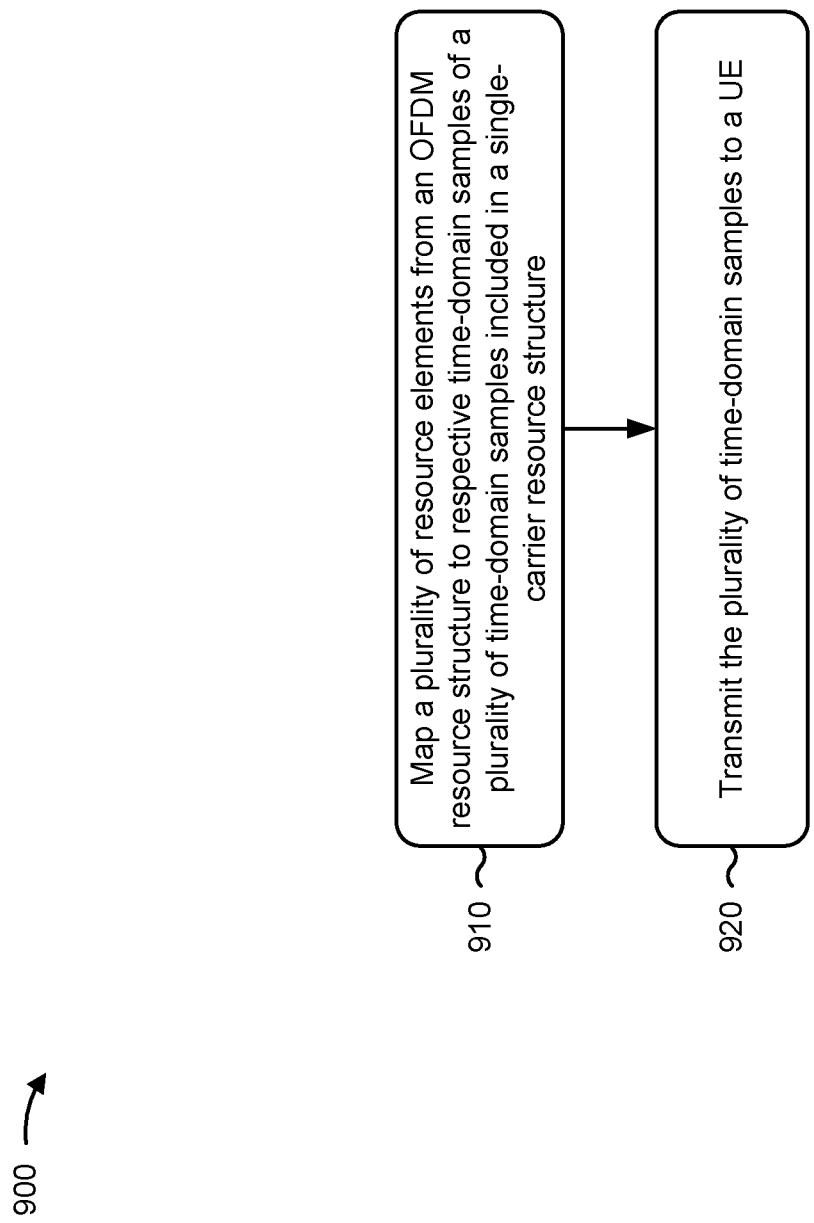
FIG. 9 is a diagram illustrating an example process performed, for example, by a base station (BS), in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs operations associated with single-carrier resource mapping for NTN deployments.

As shown in FIG. 9, in some aspects, process 900 may include mapping a plurality of resource elements from an OFDM resource structure to respective time-domain samples of a plurality of time-domain samples included in a single-carrier resource structure (block 910). For example, the BS (e.g., using transmit processor 220, receive processor 238, controller/processor 240, memory 242, and/or the like) may map a plurality of resource elements from an OFDM resource structure to respective time-domain samples of a plurality of time-domain samples included in a single-carrier resource structure, as described above.

As further shown in FIG. 9, in some aspects, process 900 may include transmitting the plurality of time-domain samples to a UE (block 920). For example, the BS (e.g., using transmit processor 220, receive processor 238, controller/processor 240, memory 242, and/or the like) may transmit the plurality of time-domain samples to a UE, as described above.

Process 900 may include additional aspects, such as any single aspect or any combination of aspects described below and/or in connection with one or more other processes described elsewhere herein.

In a first aspect, mapping the plurality of resource elements comprises mapping the plurality of resource elements in a row-major order in which all of a first subset of resource elements, of the plurality of resource elements, included in a resource block and associated with a first subcarrier, are mapped prior to a second subset of resource elements, of the plurality of resource elements, included in the resource block and associated with a second subcarrier, being mapped. In a second aspect, alone or in combination with the first aspect, mapping the plurality of resource elements comprises mapping the plurality of resource elements in a column-major order in which all of a first subset of resource elements, of the plurality of resource elements, included in a resource block and associated with a first symbol, are mapped prior to a second subset of resource elements, of the plurality of resource elements, included in the resource block and associated with a second symbol, being mapped. In a third aspect, alone or in combination with one or more of the first and second aspects, the plurality of resource elements comprise all or a subset of resource elements included in a particular resource block. In a fourth aspect, alone or in combination with one or more of the first through third aspects, the plurality of resource elements comprise all or a subset of resource elements included in a particular set of resource blocks. In a fifth aspect, alone or in combination with one or more of the first through fourth aspects, mapping the plurality of resource elements comprises mapping the plurality of resource elements, included in a particular slot, from the OFDM resource structure to the respective time-domain samples across a bandwidth associated with the BS.

In a sixth aspect, alone or in combination with one or more of the first through fifth aspects, mapping the plurality of resource elements comprises mapping the plurality of resource elements, included in a particular slot, from the OFDM resource structure to the respective time-domain samples across an BWP associated with the UE. In a seventh aspect, alone or in combination with one or more of the first through sixth aspects, mapping the plurality of resource elements comprises mapping the plurality of resource elements, included in a particular slot, from the OFDM resource structure to the respective time-domain samples across a particular downlink channel associated with the BS.

In an eighth aspect, alone or in combination with one or more of the first through seventh aspects, subsets of the plurality of resource elements are included in respective groups of resource elements, each of the respective groups of resource elements is associated with a particular channel type, and mapping the plurality of resource elements comprises independently mapping groups of resource elements according to channel type. In a ninth aspect, alone or in combination with one or more of the first through eighth aspects, process 900 further comprises mapping a plurality of OFDM radio frames to respective single-carrier radio frames in the single-carrier resource structure, mapping a plurality of OFDM subframes, included in an OFDM radio frame of the plurality of OFDM radio frames, to respective single-carrier subframes in the single-carrier resource structure, and mapping a plurality of OFDM slots, included in an OFDM subframe of the plurality of OFDM subframes, to respective single-carrier slots in the single-carrier resource structure, the plurality of resource elements being included in an OFDM slot of the plurality of OFDM slots.

In a tenth aspect, alone or in combination with one or more of the first through ninth aspects, mapping the plurality of resource elements comprises determining a quantity of the plurality of time-domain samples that is needed in order to map the plurality of resource elements from the OFDM resource structure to the respective time-domain samples; determining a respective starting time-domain sample, of the plurality of time-domain samples, for subsets of the plurality of resource elements, determining a subset length for each subset of the plurality of resource elements, and mapping a subset of the plurality resource elements based at least in part on an associated starting time-domain sample and associated subset length. In an eleventh aspect, alone or in combination with one or more of the first through tenth aspects, each resource element segment is associated with a downlink channel.

In a twelfth aspect, alone or in combination with one or more of the first through eleventh aspects, process 900 further comprises generating a mapping configuration for mapping between the OFDM resource structure and the single-carrier resource structure and transmitting an indication of the mapping configuration to the UE. In a thirteenth aspect, alone or in combination with one or more of the first through twelfth aspects, process 900 further comprises receiving, from the UE, an indication of a requested mapping configuration, the mapping configuration being based at least in part on the requested mapping configuration.

In a fourteenth aspect, alone or in combination with one or more of the first through thirteenth aspects, transmitting the indication of the mapping configuration to the UE comprises transmitting the indication of the mapping configuration to the UE in at least one of a system information communication, a PDCCH communication, a PDSCH communication, or a PBCH communication. In a fifteenth aspect, alone or in combination with one or more of the first through fourteenth aspects, transmitting the indication of the mapping configuration to the UE comprises transmitting the indication of the mapping configuration to the UE in at least one of a MIB, a SIB, an RMSI communication, an OSI communication, a DCI communication, or an RRC communication.

In a sixteenth aspect, alone or in combination with one or more of the first through fifteenth aspects, the mapping configuration includes at least one of a parameter that specifies a mapping order for mapping between the OFDM resource structure and the single-carrier resource structure, a parameter that specifies a frequency range for mapping between the OFDM resource structure and the single-carrier resource structure, a parameter that specifies a time range for mapping between the OFDM resource structure and the single-carrier resource structure, or a parameter that specifies a channel order for mapping between the OFDM resource structure and the single-carrier resource structure. In a seventeenth aspect, alone or in combination with one or more of the first through sixteenth aspects, the BS comprises a satellite BS, an HAP, or a ground backhaul BS that serves the satellite BS or the HAP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
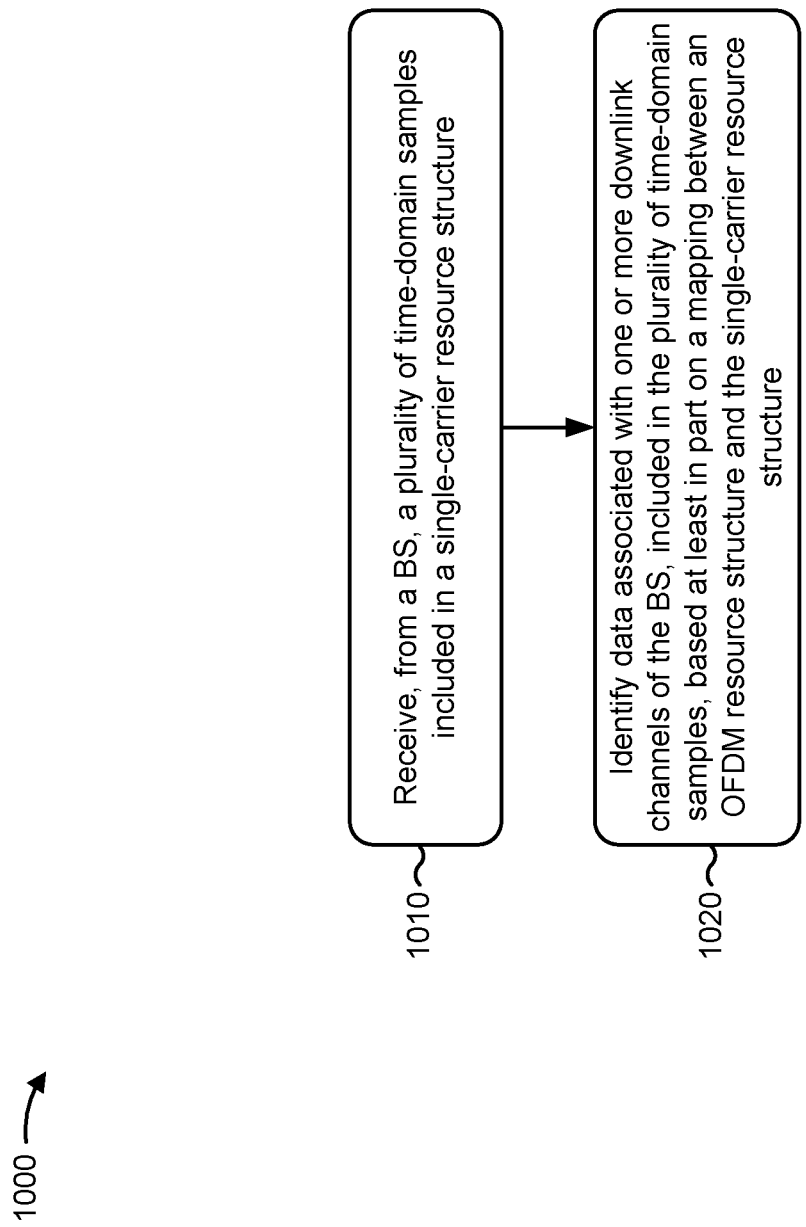
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs operations associated with single-carrier resource mapping for NTN deployments.

As shown in FIG. 10, in some aspects, process 1000 may include receiving, from a BS, a plurality of time-domain samples included in a single-carrier resource structure (block 1010). For example, the UE (e.g., using receive processor 258, transmit processor 264, controller/processor 280, memory 282, and/or the like) may receive, from a BS, a plurality of time-domain samples included in a single-carrier resource structure, as described above.

As further shown in FIG. 10, in some aspects, process 1000 may include identifying data associated with one or more downlink channels of the BS, included in the plurality of time-domain samples, based at least in part on a mapping between an OFDM resource structure and the single-carrier resource structure (block 1020). For example, the UE (e.g., using receive processor 258, transmit processor 264, controller/processor 280, memory 282, and/or the like) may identify data associated with one or more downlink channels of the BS, included in the plurality of time-domain samples, based at least in part on a mapping between an OFDM resource structure and the single-carrier resource structure, as described above.

Process 1000 may include additional aspects, such as any single aspect or any combination of aspects described below and/or in connection with one or more other processes described elsewhere herein.

In a first aspect, process 1000 further comprises receiving, from the BS, an indication of a mapping configuration for the mapping between the OFDM resource structure and the single-carrier resource structure. In a second aspect, alone or in combination with the first aspect, process 1000 further comprises transmitting, to the BS, an indication of a requested mapping configuration, the mapping configuration being based at least in part on the requested mapping configuration. In a third aspect, alone or in combination with one or more of the first and second aspects, receiving the indication of the mapping configuration comprises receiving the indication of the mapping configuration in at least one of a system information communication, a PDCCH communication, a PDSCH communication, or a PBCH communication. In a fourth aspect, alone or in combination with one or more of the first through third aspects, receiving the indication of the mapping configuration comprises receiving the indication of the mapping configuration in at least one of a MIB, a SIB, an RMSI communication, an OSI communication, a DCI communication, or an RRC communication.

In a fifth aspect, alone or in combination with one or more of the first through fourth aspects, the mapping configuration includes at least one of a parameter that specifies a mapping order for mapping between the OFDM resource structure and the single-carrier resource structure, a parameter that specifies a frequency range for mapping between the OFDM resource structure and the single-carrier resource structure, a parameter that specifies a time range for mapping between the OFDM resource structure and the single-carrier resource structure, or a parameter that specifies a channel order for mapping between the OFDM resource structure and the single-carrier resource structure. In a sixth aspect, alone or in combination with one or more of the first through fifth aspects, the BS comprises a satellite BS, an HAP, or a ground backhaul BS that serves the satellite BS or the HAP.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    mapping a plurality of resource elements from an orthogonal frequency division multiplexing (OFDM) resource structure to respective time-domain samples of a plurality of time-domain samples included in a single-carrier resource structure; and
    transmitting the plurality of time-domain samples to a user equipment (UE).

2. The method of claim 1, wherein mapping the plurality of resource elements comprises:
    mapping the plurality of resource elements in a row-major order in which all of a first subset of resource elements, of the plurality of resource elements, included in a resource block and associated with a first subcarrier, are mapped prior to a second subset of resource elements, of the plurality of resource elements, included in the resource block and associated with a second subcarrier, being mapped.

3. The method of claim 1, wherein mapping the plurality of resource elements comprises:
    mapping the plurality of resource elements in a column-major order in which all of a first subset of resource elements, of the plurality of resource elements, included in a resource block and associated with a first symbol, are mapped prior to a second subset of resource elements, of the plurality of resource elements, included in the resource block and associated with a second symbol, being mapped.

4. The method of claim 1, wherein the plurality of resource elements comprise all or a subset of resource elements included in a particular resource block.

5. The method of claim 1, wherein the plurality of resource elements comprise all or a subset of resource elements included in a particular set of resource blocks.

6. The method of claim 1, wherein mapping the plurality of resource elements comprises:
    mapping the plurality of resource elements, included in a particular slot, from the OFDM resource structure to the respective time-domain samples across a bandwidth associated with the BS.

7. The method of claim 1, wherein mapping the plurality of resource elements comprises:
    mapping the plurality of resource elements, included in a particular slot, from the OFDM resource structure to the respective time-domain samples across an active bandwidth part (BWP) associated with the UE.

8. The method of claim 1, wherein mapping the plurality of resource elements comprises:
    mapping the plurality of resource elements, included in a particular slot, from the OFDM resource structure to the respective time-domain samples across a particular downlink channel associated with the BS.

9. The method of claim 1, wherein subsets of the plurality of resource elements are included in respective groups of resource elements;
    wherein each of the respective groups of resource elements is associated with a particular channel type; and
    wherein mapping the plurality of resource elements comprises:
        independently mapping groups of resource elements according to channel type.

10. The method of claim 1, further comprising:
    mapping a plurality of OFDM radio frames to respective single-carrier radio frames in the single-carrier resource structure;
    mapping a plurality of OFDM subframes, included in an OFDM radio frame of the plurality of OFDM radio frames, to respective single-carrier subframes in the single-carrier resource structure; and
    mapping a plurality of OFDM slots, included in an OFDM subframe of the plurality of OFDM subframes, to respective single-carrier slots in the single-carrier resource structure,
        wherein the plurality of resource elements are included in an OFDM slot of the plurality of OFDM slots.

11. The method of claim 1, wherein mapping the plurality of resource elements comprises:
    determining a quantity of the plurality of time-domain samples that is needed in order to map the plurality of resource elements from the OFDM resource structure to the respective time-domain samples;
    determining a respective starting time-domain sample, of the plurality of time-domain samples, for subsets of the plurality of resource elements;
    determining a subset length for each subset of the plurality of resource elements; and
    mapping a subset of the plurality resource elements based at least in part on an associated starting time-domain sample and associated subset length.

12. The method of claim 11, wherein each resource element segment is associated with a downlink channel.

13. The method of claim 1, further comprising:
    generating a mapping configuration for mapping between the OFDM resource structure and the single-carrier resource structure; and transmitting an indication of the mapping configuration to the UE.

14. The method of claim 13, further comprising:
receiving, from the UE, an indication of a requested mapping configuration,
wherein the mapping configuration is based at least in part on the requested mapping configuration.

15. The method of claim 13, wherein transmitting the indication of the mapping configuration to the UE comprises:
transmitting the indication of the mapping configuration to the UE in at least one of:
a system information communication,
a physical downlink control channel (PDCCH) communication,
a physical downlink shared channel (PDSCH) communication, or
a physical broadcast channel (PBCH) communication.

16. The method of claim 13, wherein transmitting the indication of the mapping configuration to the UE comprises:
transmitting the indication of the mapping configuration to the UE in at least one of:
a master information block (MIB),
a system information block (SIB),
a remaining minimum system information (RMSI) communication,
an other system information (OSI) communication,
a downlink control information (DCI) communication, or
a radio resource control (RRC) communication.

17. The method of claim 13, wherein the mapping configuration includes at least one of:
a parameter that specifies a mapping order for mapping between the OFDM resource structure and the single-carrier resource structure,
a parameter that specifies a frequency range for mapping between the OFDM resource structure and the single-carrier resource structure,
a parameter that specifies a time range for mapping between the OFDM resource structure and the single-carrier resource structure, or
a parameter that specifies a channel order for mapping between the OFDM resource structure and the single-carrier resource structure.

18. The method of claim 1, wherein the BS comprises:
a satellite BS,
a high-altitude platform (HAP), or
a ground backhaul BS that serves the satellite BS or the HAP.

19. A method of wireless communication performed by a user equipment (UE), comprising:
receiving, from a base station (BS), a plurality of time-domain samples included in a single-carrier resource structure; and
identifying data associated with one or more downlink channels of the BS, included in the plurality of time-domain samples, based at least in part on a mapping between an orthogonal frequency division multiplexing (OFDM) resource structure and the single-carrier resource structure.

20. The method of claim 19, further comprising:
receiving, from the BS, an indication of a mapping configuration for the mapping between the OFDM resource structure and the single-carrier resource structure.

21. The method of claim 20, further comprising:
transmitting, to the BS, an indication of a requested mapping configuration,
wherein the mapping configuration is based at least in part on the requested mapping configuration.

22. The method of claim 20, wherein receiving the indication of the mapping configuration comprises:
receiving the indication of the mapping configuration in at least one of:
a system information communication,
a physical downlink control channel (PDCCH) communication,
a physical downlink shared channel (PDSCH) communication, or
a physical broadcast channel (PBCH) communication.

23. The method of claim 20, wherein receiving the indication of the mapping configuration comprises:
receiving the indication of the mapping configuration in at least one of:
a master information block (MIB),
a system information block (SIB),
a remaining minimum system information (RMSI) communication,
an other system information (OSI) communication,
a downlink control information (DCI) communication, or
a radio resource control (RRC) communication.

24. The method of claim 20, wherein the mapping configuration includes at least one of:
a parameter that specifies a mapping order for mapping between the OFDM resource structure and the single-carrier resource structure,
a parameter that specifies a frequency range for mapping between the OFDM resource structure and the single-carrier resource structure,
a parameter that specifies a time range for mapping between the OFDM resource structure and the single-carrier resource structure, or
a parameter that specifies a channel order for mapping between the OFDM resource structure and the single-carrier resource structure.

25. The method of claim 19, wherein the BS comprises:
a satellite BS,
a high-altitude platform (HAP), or
a ground backhaul BS that serves the satellite BS or the HAP.

26. A base station (BS) for wireless communication, comprising:
a memory; and
one or more processors operatively coupled to the memory, the memory and the one or more processors configured to:
map a plurality of resource elements from an orthogonal frequency division multiplexing (OFDM) resource structure to respective time-domain samples of a plurality of time-domain samples included in a single-carrier resource structure; and
transmit the plurality of time-domain samples to a user equipment (UE).

27. The BS of claim 26, wherein the one or more processors are further to:
generate a mapping configuration for mapping between the OFDM resource structure and the single-carrier resource structure; and
transmit an indication of the mapping configuration to the UE.

28. The BS of claim 27, wherein the mapping configuration includes at least one of:
- a parameter that specifies a mapping order for mapping between the OFDM resource structure and the single-carrier resource structure,
- a parameter that specifies a frequency range for mapping between the OFDM resource structure and the single-carrier resource structure,
- a parameter that specifies a time range for mapping between the OFDM resource structure and the single-carrier resource structure, or
- a parameter that specifies a channel order for mapping between the OFDM resource structure and the single-carrier resource structure.

29. A user equipment (UE) for wireless communication, comprising:
- a memory; and
- one or more processors operatively coupled to the memory, the memory and the one or more processors configured to:
  - receive, from a base station (BS), a plurality of time-domain samples included in a single-carrier resource structure; and
  - identify data associated with one or more downlink channels of the BS, included in the plurality of time-domain samples, based at least in part on a mapping between an orthogonal frequency division multiplexing (OFDM) resource structure and the single-carrier resource structure.

30. The UE of claim 29, further comprising:
receiving, from the BS, an indication of a mapping configuration for the mapping between the OFDM resource structure and the single-carrier resource structure,
wherein the mapping configuration includes at least one of:
- a parameter that specifies a mapping order for mapping between the OFDM resource structure and the single-carrier resource structure,
- a parameter that specifies a frequency range for mapping between the OFDM resource structure and the single-carrier resource structure,
- a parameter that specifies a time range for mapping between the OFDM resource structure and the single-carrier resource structure, or
- a parameter that specifies a channel order for mapping between the OFDM resource structure and the single-carrier resource structure.

* * * * *